INVENTOR,
GEORGE C. PIERCE.
BY Harry M. Saragovitz
ATTORNEY.

United States Patent Office 3,111,662
Patented Nov. 19, 1963

3,111,662
TIME BASE ANALOGUE-TO-DIGITAL-
CONVERTER
George C. Pierce, Floral Park, N.Y., assignor to the United States of America as represented by the Secretary of the Army
Continuation of application Ser. No. 811,239, May 5, 1959. This application Jan. 3, 1962, Ser. No. 167,995
6 Claims. (Cl. 340—347)

This application is a continuation of the application of George C. Pierce, Serial Number 811,239, filed May 5, 1959, for Analogue-To-Digital Converter.

This invention relates to analogue-to-digital converter systems, and more particularly to an analogue-to-digital converter ssytem for converting both positive and negative inputs to corresponding digital outputs proportional to the magnitude of the input.

An analogue-to-digital converter is a device which accepts instantaneous values of continuously variable quantities and expresses these values in numerical or digital form. One well known form of analogue-to-digital converter is a system for measuring a time interval by counting a number of signals or pulses which occur during the interval. The conversion from an analogue signal to an analogue time interval is accomplished by combining the analogue signal and a varying reference signal in a comparator device. The reference or comparison signal waveform varies according to a predetermined function of time. Heretofore such systems provided a binary coded output which required a decoding device in the readout circuit and, also, did not provide an indication of the algebraic sign of the input signal.

It is an object of the present invention to provide an analogue-to-digital converter wherein there is obtained a count proportional to the absolute value of the magnitude of the input, both positive and negative so as to permit a direct readout to a recording device.

It is another object of the present invention to provide an analogue-to-digital converter wherein there is obtained a polarity indication of the input and a separate polarity readout, independent of the magnitude indication, to a recording device.

It is still another object of the present invention to provide an analogue-to-digital converter wherein the accuracy of the count is independent of the initial level of the comparison waveform, leaving only slope and linearity of the waveform as factors.

In accordance with the present invention there is provided an analogue-to-digital converter for converting an analogue signal having prescribed maximum positive and negative values with respect to a reference voltage level to corresponding digital signals. Included are means for cyclically producing a sawtooth voltage starting at the beginning of each period at a predetermined positive reference level greater than the prescribed maximum positive value of the analogue signal and changing linearly in amplitude at a predetermined rate to a negative voltage level greater than the prescribed maximum negative value of the analogue signal. In addition there are included a source for generating the reference voltage, a counter and gating means for applying the counting pulses to the counter. Further included are discrete means responsive to the analogue signal and the sawtooth voltage, and the reference signal and the sawtooth voltage, respectively, whereby respective gate voltage signals are generated. One gate voltage signal is cyclically initiated when the amplitudes of the analogue signal and the sawtooth voltage are equal and the other gate voltage signal is cyclically initiated when the amplitudes of the reference voltage and the sawtooth voltage are equal, the termination of each of the gate voltages being marked by the end of the sawtooth voltage. Included further are means responsive to the gate voltages for energizing the gating means whereby the counting pulses are applied to the counter for the duration marked by the initiation of the first gate voltage and the initiation of the other gate voltage to effectively convert the analogue signal to corresponding time intervals.

For a better understanding of the invention, together with other and further objects thereof, reference is made to the following description taken in connection with the accompanying drawings in which.

Figure 1:
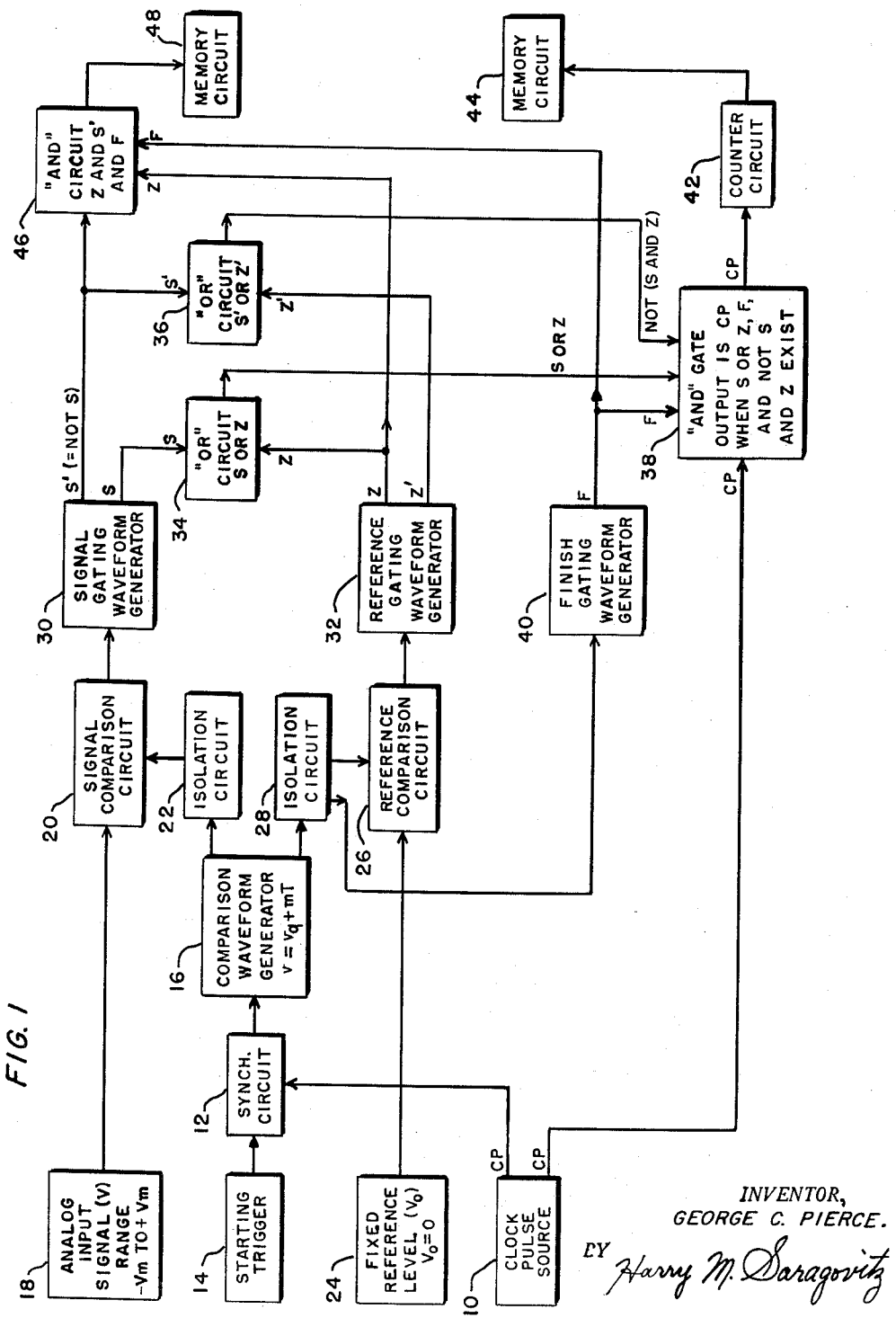
FIG. 1 is a block schematic diagram of one embodiment of the invention.
Figure 2:
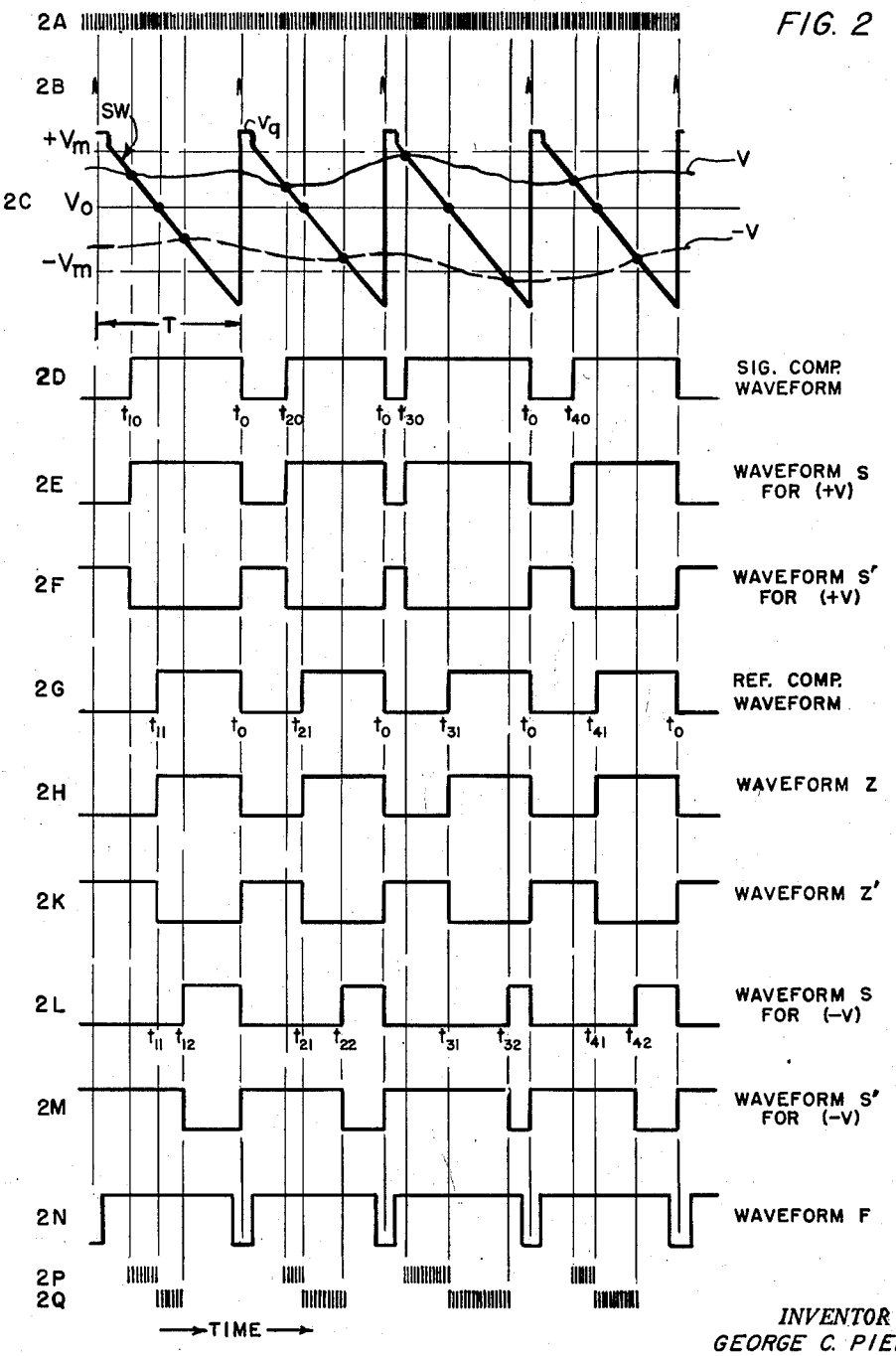
FIG. 2 is a composite diagram of the waveforms of signals appearing at various points in the embodiment of FIG. 1, and which illustrate the operation of the system.

Referring now to FIGS. 1 and 2 of the drawing, 10 is a source of continuously generated clock or timing pulses, designated CP, occurring at a constant pulse repetition frequency as shown in FIG. 2A. The clock pulses are applied to a synchronizing circuit 12 to which is also applied a starting trigger pulse (FIG. 2B) from trigger source 14. Synchronizing circuit 12 is so arranged that the first clock pulse following a trigger pulse will generate a pulse output from synchronizer 12 which initiates a sawtooth wave SW in a comparison waveform generator 16. The synchronizing of the sawtooth waveform to the pulses in this manner prevents the otherwise possible variation of one count between several conversions of the same quantity. The sawtooth comparison waveform derived from generator 16 is shown in FIG. 2C and may be expressed by the relation.

$$v = v_q + mT \qquad (1)$$

where $v_q$ is the initial output or quiescent voltage, T is the duration of the sawtooth waveform and $m$ is the rate of change, or slope, of the sawtooth voltage output with respect to time. As explained hereinbelow, $v_q$ may be either positive or negative and slope $m$ may also be positive or negative with respect to time.

The analogue input signal V, which is to be converted into digital form, is applied from source 18 as one input to a signal comparison circuit 20 to which is also applied the sawtooth waveform SW from comparison waveform generator 16 through isolation circuit 22. If $+V_m$ represents the maximum amplitude of the input signal V in one direction, positive for example, then $-V_m$ will represent the maximum amplitude of the input analogue signal V in the opposite or negative direction. The reference level of the input analogue signal will then be halfway between $-V_m$ and $+V_m$ and is hereinafter referred to as fixed reference level $V_0$ which is derived from a fixed reference signal source 24. $V_0$ thus represents the midpoint of the range of the analogue input signal and hence may be considered zero or reference ground. Reference signal $V_0$ is applied as one input to a reference comparison circuit 26 to which is also applied the sawtooth waveform SW from comparison waveform generator 16 through isolation circuit 28. One example of the relationship between the comparison waveform signal SW, the analogue input signal V and the fixed reference level $V_0$ is illustrated in FIG. 2C. While the slope $m$ of comparison waveform SW is shown as being negative and $v_q$ is shown to be greater than $+V_m$ and, like V, positive with respect to fixed reference $V_0$, it is to be understood that the polarities of the signals are not to be limited in this manner. For example, the slope $m$ may be positive and $v_q$ may be greater than $-V_m$, and like V, negative with respect to the fixed reference $V_0$.

Signal comparison circuit 20 and reference comparison circuit 26 function as conventional comparator circuits. Isolation circuits 22 and 28 prevent loading of the waveform generator or the comparison circuits by whichever comparison circuit is first activated. The output derived from signal comparison circuit 20 is a positive rectangular pulse whose leading edge is initiated when the comparison waveform output SW equals the analogue input voltage V, and whose trailing edge is produced when the comparison waveform SW returns to its quiescent value $v_q$. Similarly, the output derived from reference comparison circuit 26 is a positive rectangular pulse whose leading edge is initiated when the comparison waveform SW equals the reference signal $V_0$, and whose trailing edge is produced when the comparison waveform output SW returns to its quiescent value $v_q$. FIGS. 2D and 2G illustrate the respective outputs of signal comparison circuit 20 and reference comparison circuit 26 as hereinabove described. As shown in FIGS. 2D and 2G, $t_{10}$, $t_{20}$, $t_{30}$, $t_{40}$, etc., indicate the respective times at which the analogue voltage V is intersected by the repetitive comparison waveform SW; $t_{11}$, $t_{21}$, $t_{31}$, $t_{41}$, etc., indicate the respective times at which the reference voltage $V_0$ is intersected by the comparison waveform SW; and $t_0$ indicates the time corresponding to the quiescent condition $v_q$ of successive SW waveforms derived from generator 16. The waveform SW may include a step portion, as well known in the art, with SW remaining at quiescent voltage $v_q$ for a short time and then dropping abruptly to a value between $v_q$ and $V_m$ before the linear sloping portion of SW begins. From what has hereinabove been described, the output from signal comparison circuit 20 will constitute positive pulses having leading edges at times $t_{10}$, $t_{20}$, $t_{30}$, and $t_{40}$, respectively, and trailing edges at times $t_0$. Similarly, the output from reference comparison circuit 26 will constitute positive pulses having leading edges at times $t_{11}$, $t_{21}$, $t_{31}$, and $t_{41}$, respectively, and respective trailing edges at times $t_0$. The output of signal comparison circuit 20 is applied to a signal gating waveform generator 30 which is adapted to simultaneously generate rectangular wave outputs 180° out-of-phase. One of these outputs, shown in FIG. 2E, and hereinafter referred to as waveform S, is identical to the signal comparison output waveform shown in FIG. 2D and the other output, hereinafter referred to as waveform S', is shown in FIG. 2F. Considering now the corresponding pulses of wave outputs S and S', it can be seen that the leading edge of each positive pulse in waveform S coincides with the leading edge of its corresponding negative S' pulse, and the trailing edge of each positive S pulse coincides with the trailing edge of its corresponding negative S' pulse. Assuming the conditions shown in FIG. 2C for a positive analogue input voltage, it can be seen that the wave output S is positive only during the time interval when the value of comparison sawtooth waveform SW is less than the analogue input voltage V, that is, the signal comparison time; and the wave output S' is positive only when comparison sawtooth waveform SW is greater than the input analogue voltage V. Therefore, the presence of a positive S pulse, designated +S, indicates a signal comparison, and the presence of a positive S' pulse, designated +S', indicates the absence of a signal comparison, or simply, "not S." In a similar manner, the output of reference comparison circuit 26 is applied to a reference gating waveform generator 32 which is adapted to simultaneously generate rectangular wave outputs 180° out-of-phase. One of these outputs, shown in FIG. 2H, and hereinafter referred to as waveform Z, is identical to the reference comparison output shown in FIG. 2G, and the other output, hereinafter referred to as waveform Z', is shown in FIG. 2K. Considering the corresponding pulses of waveform outputs Z and Z', it can be seen that the leading edge of each positive Z pulse coincides with the leading edge of its corresponding negative Z' pulse, and the trailing edge of each positive Z pulse coincides with the trailing edge of its corresponding negative Z' pulse. Making the same polarity assumptions as for the discussion of waveforms S and S', it can be seen that the waveform output Z is positive, only when the value of the sawtooth waveform SW is less than that of the fixed reference level $V_0$ (or zero if $+V_m = -V_m$) and the waveform output Z' is positive only when the value of comparison sawtooth waveform SW is greater than fixed reference voltage $V_0$ (or zero). Therefore, the presence of a positive Z pulse, designated +Z, indicates a reference or zero comparison and the presence of a positive Z' pulse, designated +Z', indicates the absence of a reference or zero comparison, or simply, "not Z."

As shown, respective outputs S and Z are applied as discrete inputs to a first "OR" circuit 34, and respective outputs S' and Z' are applied as discrete inputs to a second "OR" circuit 36. These "OR" circuits are arranged in the usual manner to provide a positive output. Thus, a positive output is derived from "OR" circuit 34 if either +S or +Z is present, or both +S and +Z are present. Similarly, a positive output is derived from "OR" circuit 36 if either +S' or +Z' are present or both +S' and +Z' are present. With such as arrangement it can be seen that if either +S' or +Z' exist, then it follows that either +S or +Z do not exist, and certainly both +S and +Z are not existing simultaneously.

The combined outputs of first "OR" circuit 34 and second "OR" circuit 36 control an "AND" gate circuit 38 to which are also applied the clock pulses CP from source 10 and a gate waveform, hereinafter referred to as waveform F, derived from a finish gating waveform generator 40. Waveform generator 40 is necessary under a circumstance where it is at least possible that a clock pulse could occur simultaneously with the trailing edge of the +S output from signal gating waveform generator 30, which occurs simultaneously also with the trailing edge of +Z and the leading edges +S' and +Z'. The gate waveform output from generator 40, shown in FIG. 2N, is triggered by the sawtooth waveform SW derived from isolation circuit 28. Gating generator circuit 40 is arranged such that for practically the entire duration of each sawtooth waveform SW cycle, the output from generator 40 is a positive pulse designated +F, but very close to the end of the period T, a negative pulse of very narrow duration is formed. The total duration of the positive and negative portions of waveform F is equal to the period T. With such an arrangement, the positive portion of waveform F terminates before the positive pulses +S and +Z end, and before the positive pulses of +S' and +Z' begin, and the next positive portion of waveform F begins only after +S and +Z end and +S' and +Z' begin. It can be seen that the leading edge of +F is triggered at the instant waveform SW begins its linear sloping portion. The F pulse waveform is applied to the "AND" gate circuit 38 so that clock pulse CP from source 10 will pass as the output from "AND" gate circuit 38 when +S or +Z, +F, and not +S and +Z exist. Thus, if both +S and +Z exist, then no clock pulses CP can pass through "AND" gate circuit 38. If +S' and +Z' exist, then again no clock pulses can pass through "AND" gate circuit 38. If +S exists and +Z' exists, then clock pulses will pass through "AND" gate circuit 38 when +F is also present. If +Z and +S' exist, then, again, clock pulses will pass through "AND" gate circuit 38 when +F is also present. From FIGS. 2D–2K, it can be seen that, for relatively positive input analogue signals +V, S is positive and Z is negative (Z' positive) for the durations $t_{10}-t_{11}$, $t_{20}-t_{21}$, $t_{30}-t_{31}$, $t_{40}-t_{41}$, each duration being equal to the time it takes the comparison waveform SW to vary linearly between the signal level and the reference level $V_0$. Due to the linearity of the slope of comparison waveform SW, it can be seen that these durations are proportional to the magnitude of the input voltage +V at respective times $t_{10}$, $t_{20}$, $t_{30}$, $t_{40}$, etc. Hence, the number of clock pulses passing through "AND" gate circuit 38 for these durations (FIG. 2P) are a measure of the corresponding input signal magnitudes. For negative input signals, −V, as shown in the dashed line of FIG. 2C, the same conditions hold true, but the polarity of the pulses are reversed, that is, Z is positive and S is negative (S' positive). FIG. 2L illustrates the waveform S for negative input analogue signals and FIG. 2M illustrates the corresponding waveform S' for such negative inputs. In this case, the clock pulses will pass through "AND" gate circuit 38 for the durations $t_{11}-t_{12}$, $t_{21}-t_{22}$, $t_{31}-t_{32}$, $t_{41}-t_{42}$, etc., each of these durations corresponding to the time it takes for the comparison waveform SW to vary linearly between the reference level $V_o$ and the signal level. Thus, the time taken to vary from zero voltage to some negative voltage is proportional to the magnitude thereof, and the clock pulses passing through "AND" gate circuit 38 for such durations (FIG. 2Q) are a measure of these magnitudes. The clock pulses passing through "AND" gate circuit 38 are passed through a conventional counter circuit 42, operating on the decimal system for example, and then applied to a first memory circuit 44 where the count is held until a readout is desired.

In order to indicate the polarity of the analogue input signal, the Z waveform output and the S' waveform output are applied as discrete inputs to "AND" circuit 46, to which is also applied the waveform F. "AND" circuit 46 is arranged so that it provides an output only when both +Z and +S' and +F are present. This is equivalent to stating that Z is present, that is +Z, but +S is not present (S' positive). As hereinabove explained, this can only occur for a negative input signal (−V). The output of "AND" circuit 46 is applied to a second memory circuit 48 which holds the information until a readout is called for.

Figure 3:
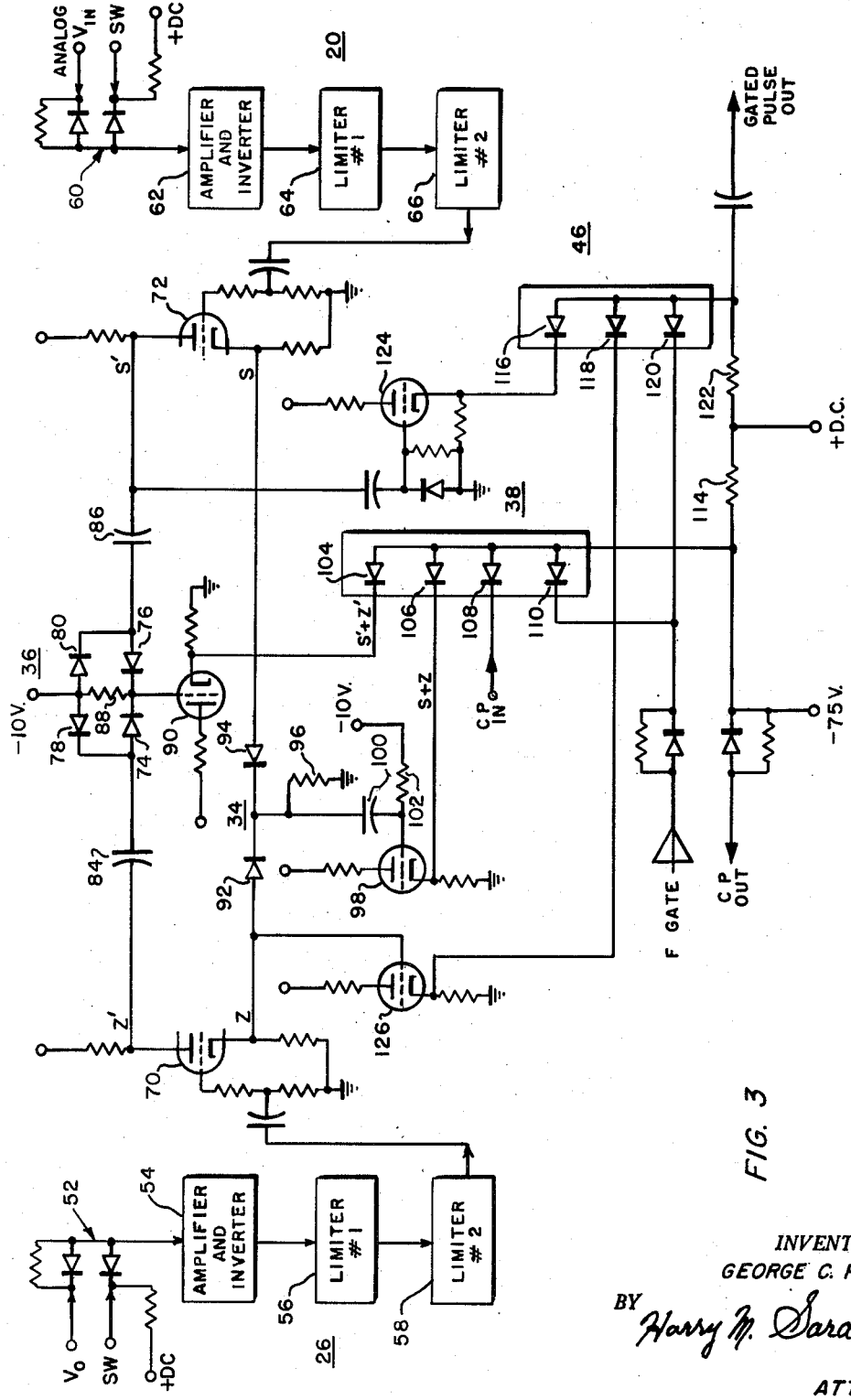
FIG. 3 is a schematic diagram illustrating the detailed circuitry of the "AND" and "OR" circuits shown in block form in FIG. 1.

FIG. 3 illustrates in block and schematic form the detailed circuitry for deriving the Z and S waveforms and the "OR" and "AND" circuits associated therewith. Like numerals refer to like components. For the sake of clarity, the detailed circuitry of comparison waveform generator 16 and isolation circuits 22 and 28 are not shown inasmuch as such circuits are well known in the art and no description thereof is believed necessary. Reference comparison circuit 26 includes a conventional diode comparator circuit 52 to which is applied the reference signal $V_o$ and the comparison waveform SW. Whenever the reference signal is equal in amplitude to the waveform SW, comparator circuit 52 produces an output signal. The reference comparison waveform shown in FIG. 2G is produced by applying the output of comparator 52 to cascaded amplifier stage 54 and limiter and amplifier stages 56 and 58. Similarly, the signal comparison circuit 20 includes a diode comparator circuit 60 to which is applied the input analogue voltage V and the comparison waveform SW, and which produces an output pulse when the input signal is equal in amplitude to the waveform signal SW. The signal comparison waveform shown in FIG. 2D is produced by applying the output of comparator 60 to cascaded amplifier stage 62 and limiter and amplifier stages 64 and 66. As shown, the reference comparison waveform is applied to the grid of tube 70 which is adapted to provide simultaneous plate and cathode circuit outputs which are 180° out-of-phase. The waveform Z in FIG. 2H is derived from the cathode circuit of tube 70 and the waveform Z', in FIG. 2K, is derived from the plate circuit thereof. In a similar manner, the signal comparison waveform is applied to the grid of tube 72 which is also adapted to provide simultaneous plate and cathode circuit outputs which are 180° out-of-phase. The waveform S, FIG. 2E, is derived from the cathode circuit of tube 72 and the waveform S', FIG. 2F, is derived from the plate circuit thereof. The respective outputs from the plate circuits of tubes 70 and 72 are applied as discrete inputs to second "OR" circuit 36 which includes a first pair of oppositely poled diodes 74 and 76 and a second pair of oppositely poled diodes 78 and 80. The diodes 74 and 76 have their cathodes connected in common and the diodes 78 and 80 have their anodes connected in common, the remaining electrodes of the diodes being respectively coupled to the plates of tubes 70 and 72 through capacitors 84 and 86. A resistor 88 interconnects the common connections of the pair of diodes. The junction of diodes 78 and 80 are connected to a suitable negative voltage source while the opposite end of resistor 88 is connected to the grid of a cathode follower tube 90. By such an arrangement, it can be seen that a positive output pulse will be derived from the output of cathode follower tube 90 only if either +S' (not S) or +Z' (not Z) or both +S' and +Z' are present.

The respective cathode outputs of tubes 70 and 72 are applied to first "OR" circuit 34 which includes a pair of oppositely poled diodes 92 and 94 having their cathodes connected in common to ground through resistor 96 and their respective anodes connected to the cathodes of tubes 70 and 72. The common cathode connection of diodes 92 and 94 is also applied to the grid of cathode follower tube 98 through capacitor 100, the grid of cathode follower 98 being also connected to a negative potential through resistor 102. With this arrangement, a positive signal will be derived from the output of cathode follower 98 only if either +S or +Z or both +S and +Z are present. As shown, the output of cathode follower 90, the output of cathode follower 98, clock pulse CP and F gate pulses are respectively applied to the cathodes of discrete diodes 104, 106, 108, and 110, which comprise "AND" gate output circuit 38. The anodes of diodes 104, 106, 108, and 110 are connected in common to one end of resistor 114, the other end of resistor 114 being connected to a positive potential as shown. Thus, it can be seen that clock pulses CP will pass through "AND" gate 38 only when the outputs of cathode followers 90 and 98 are positive and +F is also present. Up to this point it can be seen that if both +S and +Z are present, a positive output will be derived from cathode follower 98 but no positive pulse will be derived from cathode follower 90. Hence, under these conditions, diode 104 of "AND" gate circuit 38 will be conductive so that no clock pulses can pass through "AND" gate 38. If both +S' and +Z' are present, a positive output will be derived from cathode follower 90 but no positive output can be derived from cathode follower 98. Under such conditions diode 106 of "AND" gate circuit 38 will be conductive so that, again, no clock pulses can pass through "AND" gate 38. If, however, both +S and +Z' (not Z) exist, then cathode followers 90 and 98 will provide positive output pulses so that diodes 104 and 106 will both be rendered non-conductive. Similarly, cathode followers 90 and 98 will provide positive output pulses if both +Z and +S' (not S) are present. With positive output pulses from both cathode followers 90 and 98, and with +F present, diodes 104, 106, and 110 of "AND" gate circuit 38 will be rendered non-conductive so that clock pulses will pass through diode 108 of "AND" gate circuit 38. The "AND" circuit 46 includes three discrete diodes 116, 118, and 120, having their anodes connected in common to one end of resistor 122, the other end of resistor 122 being connected to a positive potential as shown. The output of the plate of tube 72 is applied to the cathode of diode 116 through cathode follower 124; the output of the cathode of tube 70 is applied to the cathode of diode 118 through cathode follower 126; and the F gate is applied to the cathode electrode of diode 120. With this arrangement, a pulse will be derived from "AND" circuit 46 only when +S', +Z, and +F are present at the respective cathode of diodes 116, 118, and 120. As hereinabove described, this can only occur for a negative input signal.

While there has been described what is at present considered to be the preferred embodiment of this invention, it will be obvious to those skilled in the art that various changes and modifications may be made therein without departing from the invention, and it is, therefore, aimed

What is claimed is:

1. An analogue-to-digital converter for converting an analogue signal having prescribed maximum positive and negative values to corresponding digital signals comprising: a source for generating a continuous prescribed fixed direct-current reference voltage at an amplitude level halfway between said maximum positive and maximum negative values; means for cyclically producing a sawtooth voltage starting at the beginning of each period at a positive level greater than said maximum positive value and changing linearly in amplitude at a predetermined rate to a negative voltage level greater than said maximum negative value; a counter; gating means for applying counting pulses to said counter; means responsive to said analogue voltage and said sawtooth voltage whereby there are produced first (S) and second (S') signal waveforms in phase opposition and each comprising alternate relative positive and negative voltage levels for each period of said sawtooth voltage, the positive levels of said first (S) waveform and the oppositely phased negative level of said second (S') waveform being initiated when the amplitudes of said analogue signal and said sawtooth voltage are equal, and terminated at the end of the sawtooth voltage; means responsive to said reference voltage and said sawtooth voltage whereby there are produced third (Z) and fourth (Z') signal waveforms in phase opposition and each comprising alternate relative positive and negative voltage levels for each period of said sawtooth voltage, the positive level of said third (Z) signal waveform and the oppositely phased negative level of said fourth (Z') signal waveform being initiated when the amplitudes of said reference voltage and said sawtooth voltage are equal, and terminated at the end of said sawtooth voltage; and discrete means responsive to said first (S) and third (Z) signal waveforms and said second (S') and fourth (Z') waveforms, respectively, for energizing said gating means whereby said counting pulses are applied to said counter for the duration marked by the initiation of the positive levels of said first (S) waveform and the initiation of the positive levels of said third (Z) waveform to effectively convert the analogue signal to corresponding time intervals.

2. The system in accordance with claim 1 wherein said last mentioned means comprises a first OR circuit having its output in circuit with said gating means and its input responsive to said first (S) and third (Z) waveforms to produce an output pulse when either of the positive levels thereof is present, and a second OR circuit having its output in circuit with said gating means and its input responsive to said second (S') and fourth (Z') waveforms to produce an output pulse when either one of the positive levels thereof is present.

3. The system in accordance with claim 1 and further including an AND circuit responsive to said second (S') and third (Z) signal waveforms for producing an output pulse only when the positive levels of said second (S') and third (Z) signal waveforms simultaneously occur.

4. An analogue-to-digital converter for converting an analogue signal having prescribed maximum positive and negative values to corresponding digital signals comprising: a source for generating a continuous prescribed fixed direct-current reference voltage at an amplitude level halfway between said maximum positive and maximum negative values; a counter; gating means for applying counting pulses to said counter at a predetermined frequency; means for cyclically producing a sawtooth voltage waveform starting at the beginning of each period at a positive level greater than said maximum positive value and changing linearly in amplitude at a predetermined rate to a negative level greater than said maximum negative value; means responsive to said analogue voltage and said sawtooth voltage whereby there are produced first (S) and second (S') signal waveforms in phase opposition and each comprising alternate positive and negative voltage levels wherein the duration of the positive level of said first (S) waveform and the oppositely phased negative level of said second (S') waveform corresponds to the time that the amplitude of said sawtooth voltage is less than said analogue signal, and the duration of the negative level of said first waveform (S) and the oppositely phase positive level of said second waveform (S') corresponds to the time that the amplitude of said sawtooth voltage is greater than said analogue signal; means responsive to said reference voltage and said sawtooth voltage whereby there are produced third (Z) and fourth (Z') signal waveforms in phase opposition and each comprising alternate positive and negative voltage levels wherein the duration of the positive level of said third waveform (Z) and the oppositely phased negative level of said fourth waveform (Z') corresponds to the time that the amplitude of said sawtooth voltage is less than said fixed reference voltage and the duration of the negative level of said third waveform (Z) and the oppositely phased positive level of said fourth waveform (Z') corresponds to the time that the amplitude of said sawtooth voltage is greater than said fixed reference voltage; means having its output in circuit with said gating means and responsive to said first (S) and third (Z) waveforms for producing an output pulse when either one of the positive levels thereof is present; means having its output in circuit with said gating means and responsive to said second (S') and fourth (Z') waveforms for producing an output pulse when either one of the positive levels thereof is present; said gating means being responsive to said output pulses to apply said counting pulses to said counter only when both of said output pulses simultaneously occur whereby the analogue signal is effectively converted to corresponding time intervals marked by the duration of the simultaneous occurrence of said output pulses.

5. The converter in accordance with claim 4 and further including a source of gating voltage having its output in circuit with said gating means and responsive to said sawtooth voltage waveform to cyclically produce positive pulses of a duration substantially equal to the period of said cyclically generated sawtooth voltage waveform, said gating means being adapted to pass said counting pulses only when both of said output pulses and the positive gating voltage occur simultaneously.

6. The converter in accordance with claim 4 and further including means responsive to said second (S') and third (Z) signal waveforms for producing an output signal only when the positive levels of said second (S') and third (Z) signal waveforms simultaneously occur.

References Cited in the file of this patent

UNITED STATES PATENTS

| 2,787,418 | MacKnight et al. | Apr. 2, 1957 |
| 2,994,825 | Anderson | Aug. 1, 1961 |

OTHER REFERENCES

Klein et al.: Analog-to-Digital Conversion, "Instruments and Automation," May 1956, pp. 911, 917 (page 912 relied on).